United States Patent Office 3,466,278
Patented Sept. 9, 1969

3,466,278
MELAMINE DERIVATIVES AND PROCESS FOR THEIR PRODUCTION
Richard Hochreuter and Robert Christian Keller, Basel, Switzerland, assignors to Sandoz Ltd., Basel, Switzerland, a corporation of Switzerland
Filed Sept. 6, 1967, Ser. No. 665,778
Claims priority, application Switzerland, Oct. 31, 1966, 15,728/66
Int. Cl. C07d 55/24
U.S. Cl. 260—249.6   17 Claims

ABSTRACT OF THE DISCLOSURE

Novel quaternized melamine derivatives suitable for use as emulsifiers, softeners or antistatic agents in textile, leather and paper articles and emulsifiers, especially for paraffin in water emulsions, or for the production of agents for engendering hydrophobicity, said quaternized melamine derivatives being reaction products of (i) hexamethylolmelamine-hexamethyl, -ethyl, -propyl or -butyl ether,
(ii) triethanolamine stearate, behenate, acetate, formate or mixtures of any two or more of these, or methyldiethanolamine acetate, with or without free amine, and
(iii) stearyl alcohol, are produced.

BACKGROUND OF THE INVENTION

Figure 1:
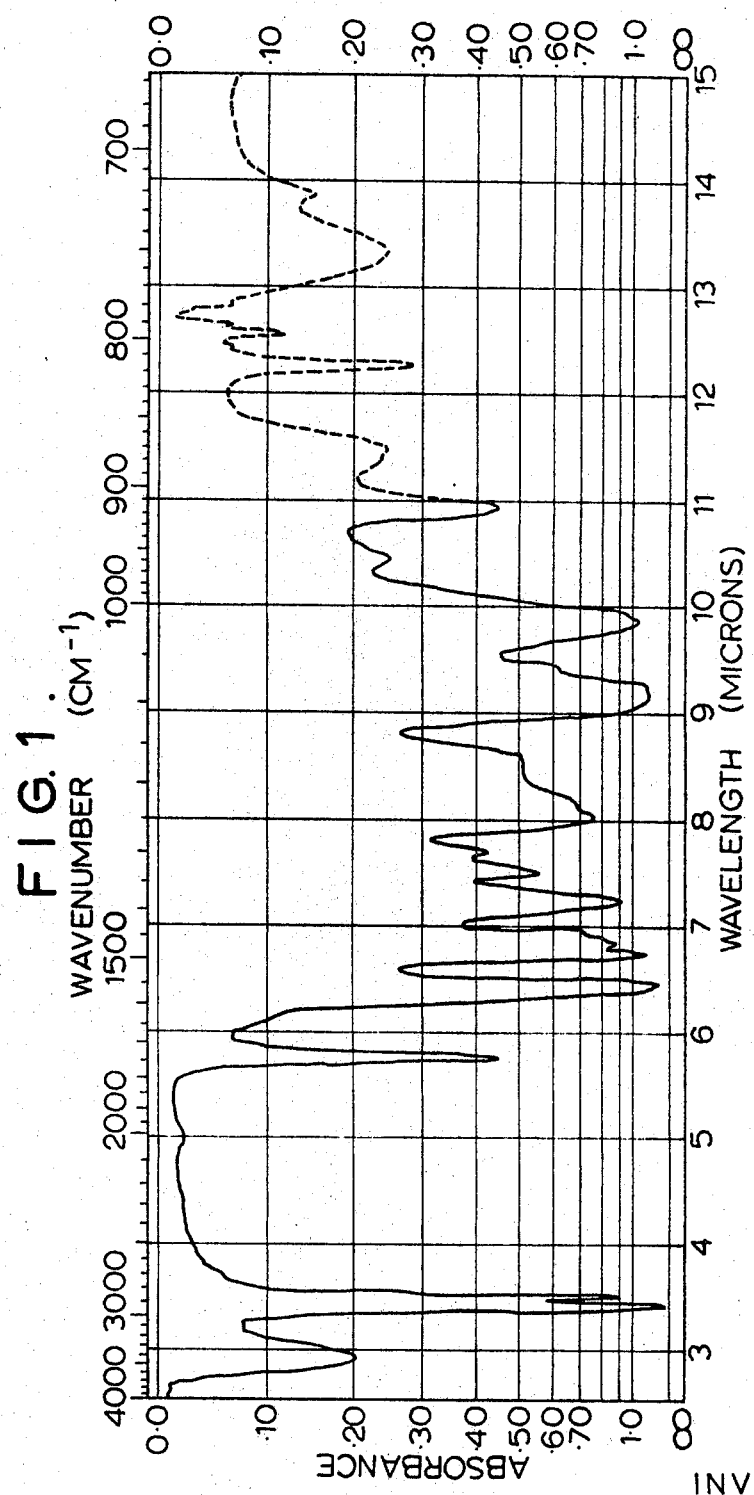

The quaternization products of the present invention have a wax-like appearance; they are soluble or dispersible in water. They may be used as emulsifiers as well as softeners and antistatic agents in the textile, leather and paper industries and as emulsifiers especially for paraffin in water for the production of agents for engendering hydrophobicity.

It has been found surprisingly that emulsions of the quaternization products of the present invention may be produced in simple manner and in a very fine, highly concentrated form, and that they show a very good shelf life even in an acid pH range (i.e., pH value 5–7) at an elevated temperature, for example at 40° C. This finding is the more remarkable, because similar reactive melamine derivatives of which the production is described in German patent specification No. 956,990 of Aug. 19, 1952, require complicated operations to convert them to concentrated aqueous dispersions which, moreover, have only a very limited shelf life. The same disadvantage is shown by the condensation products which may be produced according to Swiss patent specification No. 405,226 of Jan. 15, 1966, for example, from hexamethylolmelamine, a fatty acid and a triethanolamine salt.

SUMMARY OF THE INVENTION

The present invention provides a water soluble or water dispersible, hardenable quaternized melamine derivative containing monocarboxylic acid radicals with 1 to 30 carbon atoms, alkoxy radicals with 12 to 30 carbon atoms and quaternary nitrogen atoms, resulting by the reaction of 1 mol of hexamethylolmelamine at least 80% by weight of which is etherified with a low molecular weight alcohol with (a) One or more organic monocarboxylic acids with 1 to 30 carbon atoms,
(b) 0.5 to 1.2 mols of a tertiary amine containing at least one hydroxy alkyl radical with 2 to 4 carbon atoms, and
(c) 0.5 to 2.5 mols of a fatty alcohol with 12 to 30 carbon atoms or mixture of such fatty alcohols, with the proviso that at least 80% of (b) must be present in the form of a salt with (a) and that the total quantity of (a) used amounts to 0.4 to 2.5 mols, the portion of any monocarboxylic acid or acids with 12 to 30 carbon atoms present being chosen in such a way that the sum of the latter and (c) amounts to at least 1 mol and at most 2.5 mols, and quaternizing thereafter.

Preferred quaternized melamine derivatives of the invention are quaternized reaction products of (i) hexamethylolmelamine-hexamethyl, -ethyl, -propyl or -butyl ether,
(ii) triethanolamine stearate, behenate, acetate or formate, or mixtures of any two or more of these, or methyldiethanolamine acetate, with or without free amine, and
(iii) stearyl alcohol.

The process of the present invention is characterized in that 1 mol of a hexamethylolmelamine at least 80% by weight of which is etherified with a low molecular weight alcohol is reacted with (a) One or more organic monocarboxylic acids with 1 to 30 carbon atoms,
(b) 0.5 to 1.2 mols of a tertiary amine containing at least one hydroxy alkyl radical with 2 to 4 carbon atoms, and
(c) 0.5 to 2.5 mols of a fatty alcohol or a fatty alcohol mixture with 12 to 30 carbon atoms, with the proviso that at least 80% of (b) must be present in the form of a salt with (a) and that the total quantity of (a) used amounts to 0.4 to 2.5 mols, the portion of any monocarboxylic acid or acids with 12–30 carbon atoms present being chosen in such a way that the sum of the latter and (c) amounts to at least 1 mol and at most 2.5 mols, the reaction being effected simultaneously or in any desired sequence under reaction conditions such that a sample of the reaction product is soluble or dispersible in 2 N acetic acid to give a clear or opalescent homogeneous liquid, and the reaction product is then quaternized.

DETAILED DESCRIPTION

The term "low molecular weight alcohol" as used herein designates an alcohol with from 1 to 4 carbon atoms. Examples of low molecular weight alcohols suitable for the etherification of the hexamethylolmelamine are: methyl, ethyl, propyl and butyl alcohol or mixtures thereof. Although, as indicated above, the degree of etherification must amount to at least 80% by weight, it is preferred that 90% by weight or more of the melamine be etherified. A specific example of a suitable melamine ether is hexamethylolmelamine hexamethyl ether.

The organic monocarboxylic acids with 1 to 30 carbon atoms mentioned at (a) above include saturated as well as unsaturated, straight chain as well as branch chain, naturally occurring as well as synthetic acids. Specific examples of relatively low molecular weight acids are formic, acetic and propionic acid (especially acetic and propionic acid); specific examples of relatively high molecular weight acids are lauric, myristic, palmitic, stearic, arachidic, behenic, oleic, elaidic, ricinoleic, linoleic and α-linolenic acid as well as monocarboxylic acids obtainable by oxidation of wax or other synthetic means.

The monocarboxylic acids (a) above may be used singly or in admixture with one another, for example as a fatty acid mixture constituted by palmitic, stearic and oleic acids or by stearic, arachidic and behenic acid; another example of a suitable mixture is one of acetic and stearic acid or one of acetic and behenic acid. The acid or acid mixture may be charged in one batch or in two or more portions.

The fatty alcohols with 12 to 30 carbon atoms (c) above may have a branched or unbranched chain, they may be of natural or synthetic origin and they may be substituted with oxygen or sulphur atoms. Preferred such materials are lauryl, myristic, palmityl, stearyl, arachic, behenyl, oleyl alcohol as well as octadecadienol and -trienol derived from linoleic and α-linolenic acid respectively.

Examples of tertiary amines containing at least one hydroxy alkyl radical with 2 to 4 carbon atoms (b) above are: dimethyl- or diethylethanolamine, methyl- or ethyldiethanolamine and especially those tertiary amines which contain 3 hydroxy alkyl radicals with 2 to 4 carbon atoms, specifically those, for example, which are derived from aminotrishydroxymethylmethane, for instance dimethylaminotrishydroxymethylmethane, further tris-(2'-hydroxypropyl)- or tris-(3'-hydroxypropyl)-amine and, especially, triethanolamine.

Suitable quaternizing agents are the usual ones, especially dimethyl sulphate and diethyl sulphate which give rise to excellent quaternization products.

The materials to be quaternized may be produced in various ways. For example, the hexaalkoxymethylmelamine may be reacted simultaneously with the monocarboxylic acid or acids (a), the tertiary amine (b) and the fatty alcohol or fatty alcohol mixture (c), or condensed first with the monocarboxylic acid or acids (a) and the tertiary amine (b) and then with the fatty alcohol or fatty alcohol mixture (c), or reacted first with the monocarboxylic acid or acids (a) and the fatty alcohol or fatty alcohol mixture (c) and then with the teritary amine (b) in the form of a monocarboxylic acid salt.

The reaction may be effected by melting together the reaction components without solvent or in the presence of a solvent, for example xylene, mono- or dichlorobenzene, paraffin or paraffin oil, at temperatures of 100 to 200° C., preferably at 120–180° C., the low molecular weight alcohols resulting from the hexaalkoxymethylmelamine being removed from the reaction mixture. For this purpose it is possible to work at a reduced pressure, for example at 10–200 mm. of Hg, or at atmospheric pressure. Atmospheric pressure is advantageous when the monocarboxylic acid salt of the tertiary amine is the acetate, as distilling off acetic acid may be thereby avoided to a large extent.

When all the reaction components are reacted simultaneously, the condensation is continued until a sample of the reaction product is soluble, or dispersible with opalescence, in warm 2 N acetic acid.

When the hexaalkoxymethylmelamine is reacted first with the monocarboxylic acid or acids and the tertiary amine, condensation between these compounds is effected until the reaction product is soluble in warm 2 N acetic acid, the fatty alcohol or fatty alcohol mixture is then added and the resulting material is heated until a sample of the product is soluble, or dispersible with opalescence, in warm 2 N acetic acid.

When the hexaalkoxymethylmelamine is first reacted with the monocarboxylic acid or acids and the fatty alcohol or fatty alcohol mixture, the condensation is continued until the acid number is less than 10 and the reaction product is then reacted with a monocarboxylic acid salt of the tertiary amine until a sample of the product is soluble, or dispersible with opalescence, in warm 2 N acetic acid.

When, in the process of the invention, there is used an acid or acid mixture (a) above comprising at least 0.4 mol of a fatty acid with 2 or 3 carbon atoms in the molecule, per mol of the hexamethylolmelamine alkyl ether, there are obtained products which, either alone or in combination with paraffin, give particularly stable solutions or emulsions.

The mol ratio between the starting materials may vary within the above mentioned limits, depending on the intended use of the end product and depending on whether there is used, as the tertiary amine salt, a salt of a tertiary amine with a low molecular or high molecular weight organic monocarboxylic acid or a mixture of such acids.

For every mol of hexaalkoxymethylmelamine there are used advantageously 0.8 to 1.2 mols of tertiary amine, 0.6 to 1.2 mols of monocarboxylic acid or acids when using one or more high molecular weight monocarboxylic acids or 0.6 to 1.5 mols when using one or more low molecular weight monocarboxylic acids or mixtures of low molecular weight and high molecular weight monocarboxylic acids, and 0.8 to 2.2 mols of fatty alcohol.

The conversion of the resulting basic condensation products to quaternary ammonium compounds is effected in accordance with known methods by treatment with the usual alkylation agents, preferably at an elevated temperature.

Figure 2:
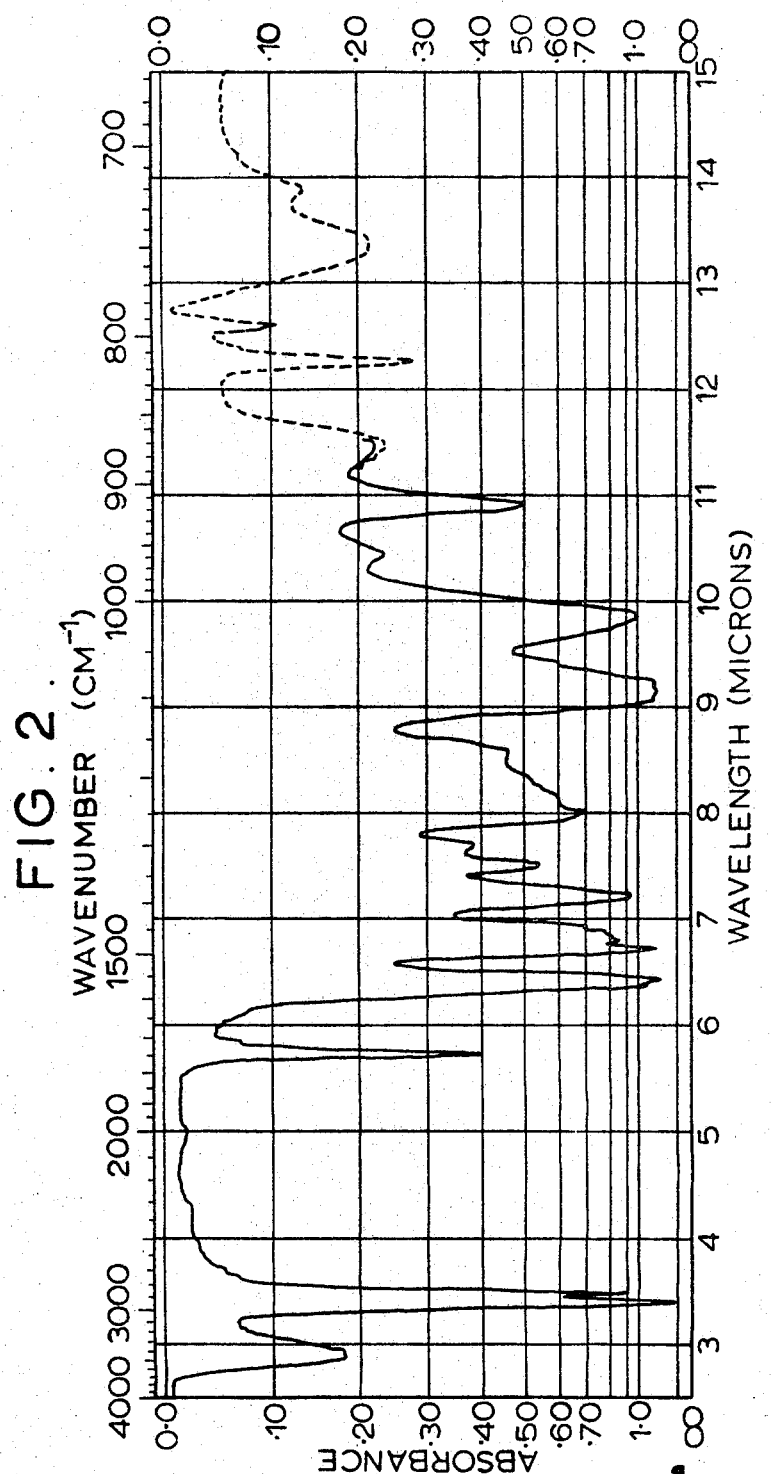
Figure 3:
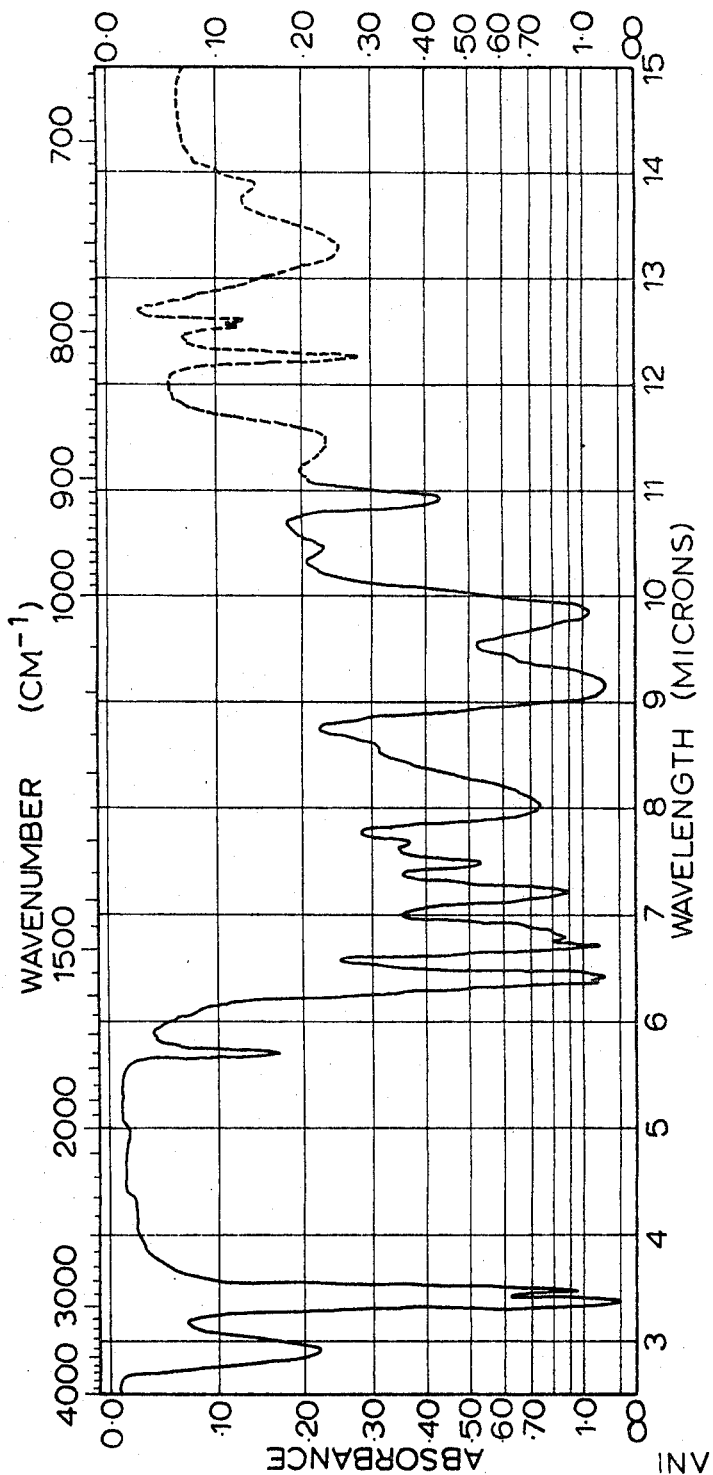
Figure 4:
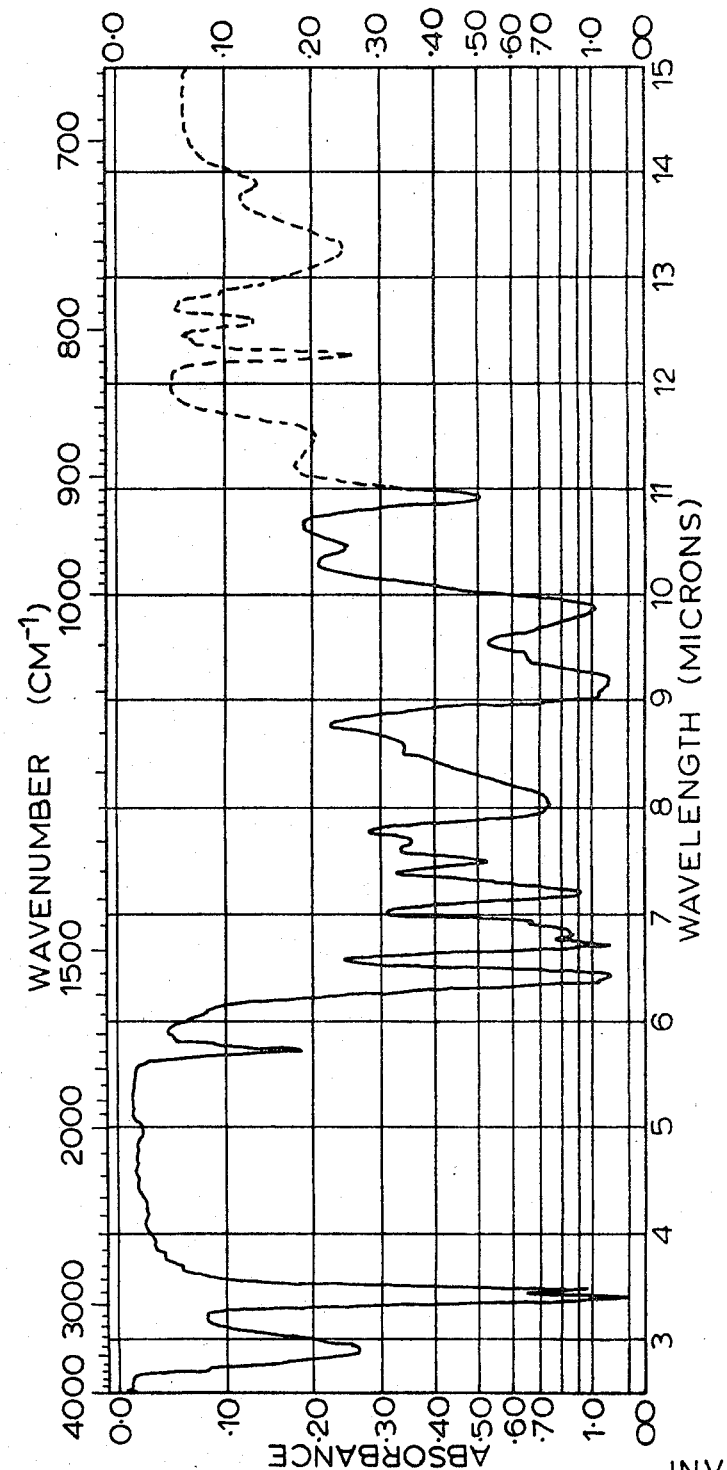
Figure 5:
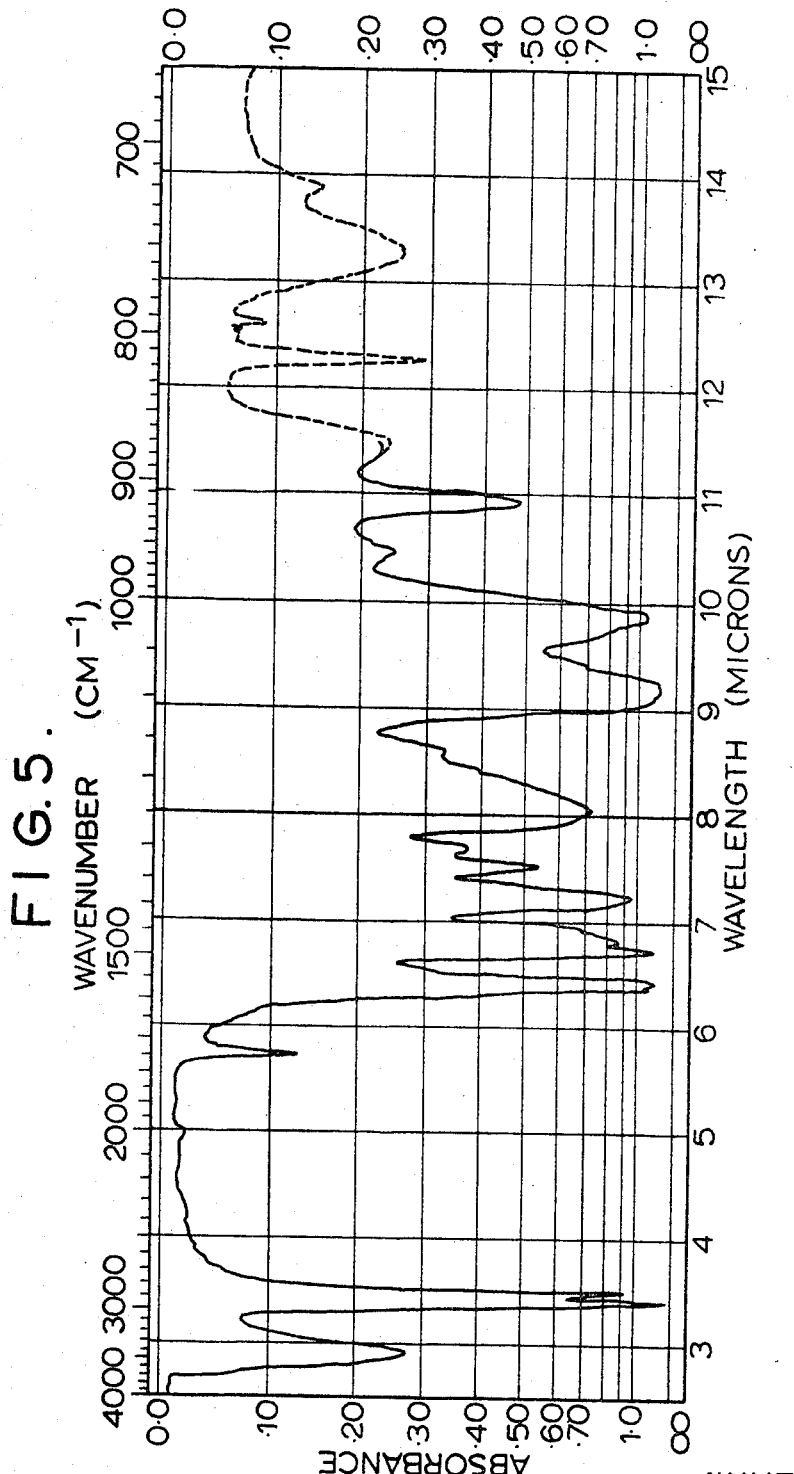
Figure 6:
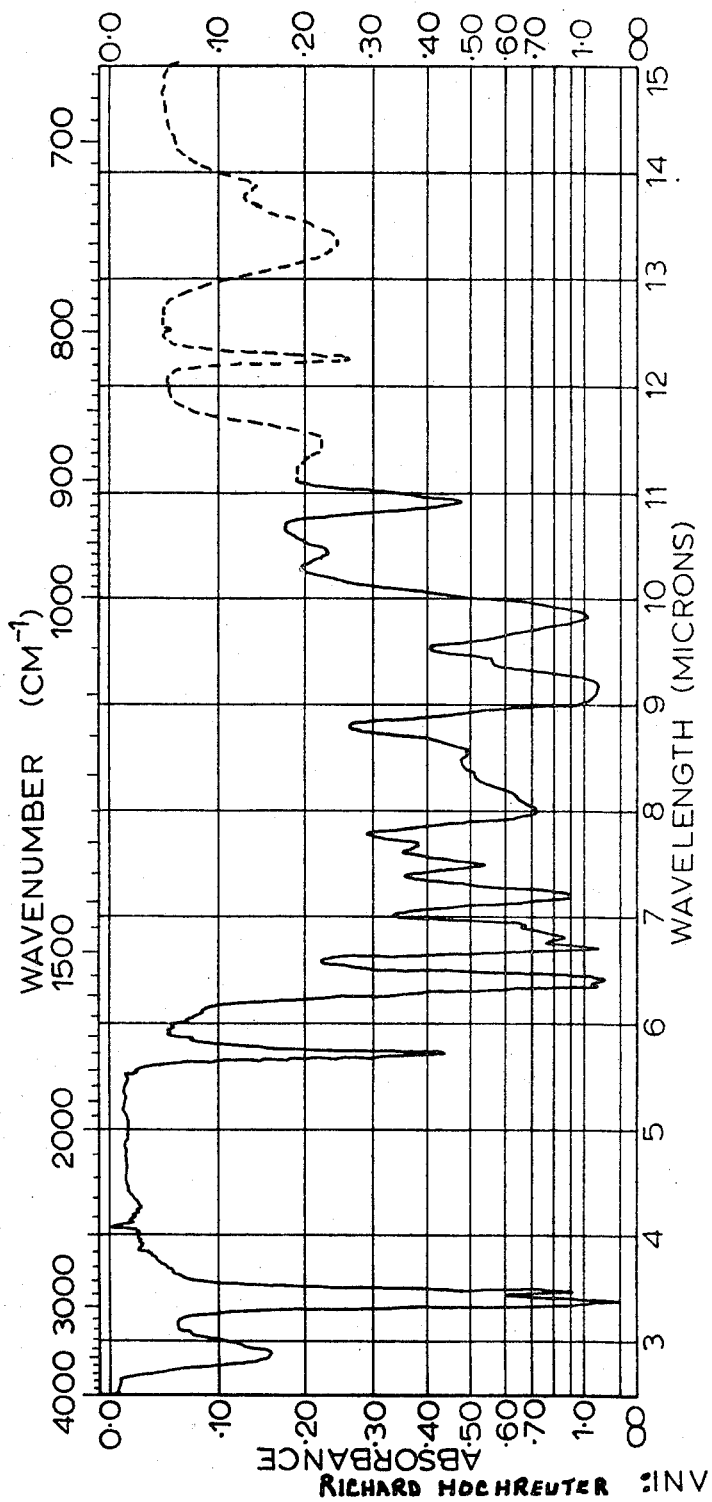
Figure 7:
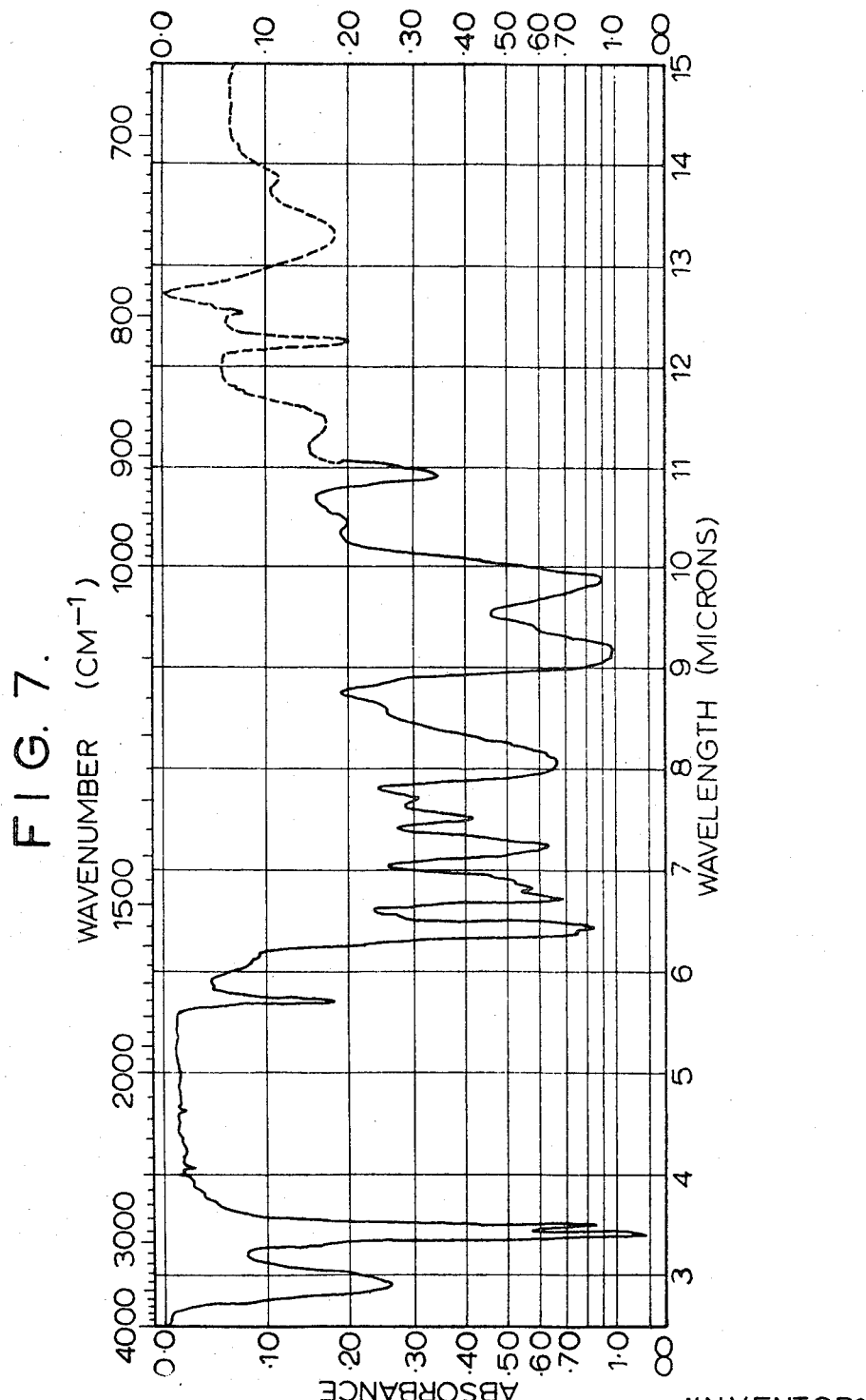
Figure 8:
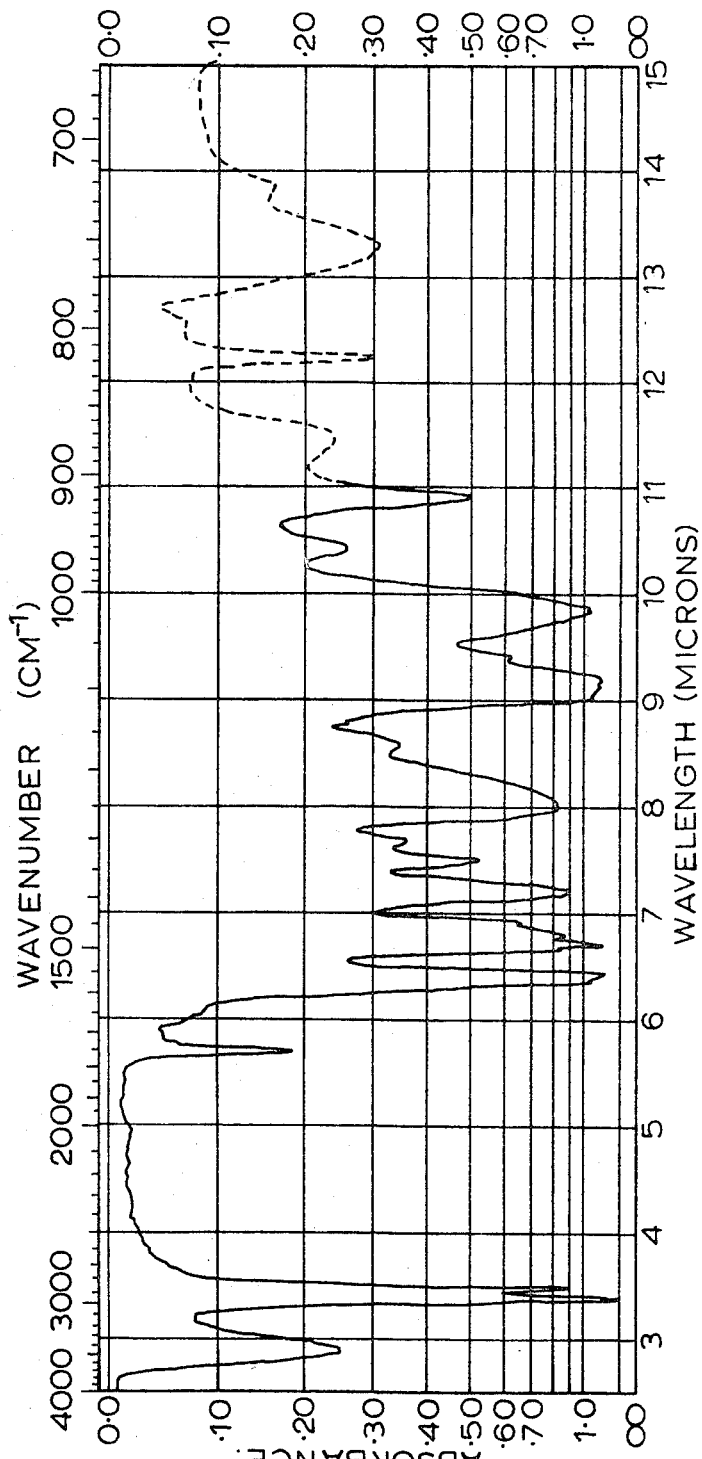
Figure 9:
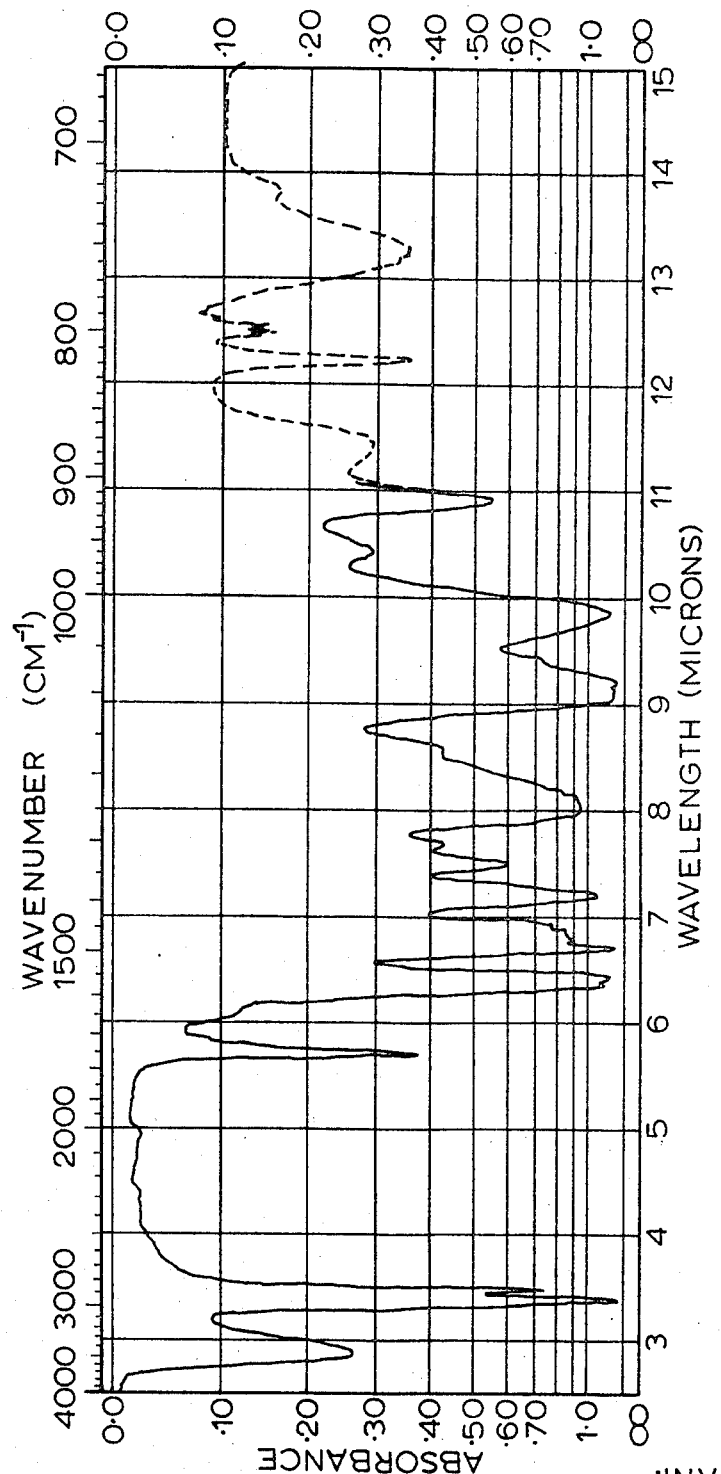
Figure 10:
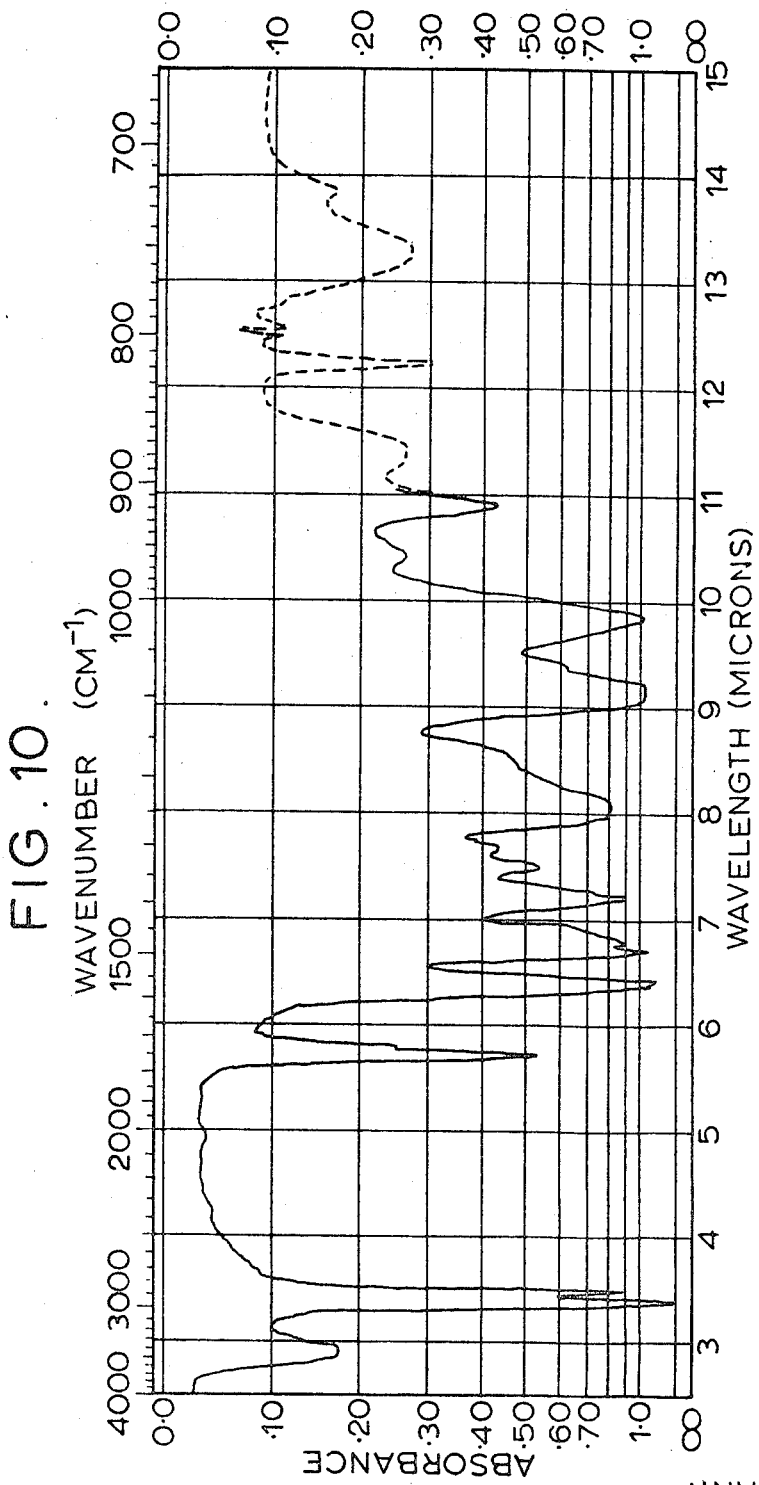

The accompanying drawings FIGS. 1–10 represent infrared spectra of the products resulting by following the procedure of Examples 1–10 respectively given hereinafter. The continuous curve in each figure is that obtained for $CCl_4$ (0–11) and the dotted curve that for $CS_2$ (11–15) as solvent. In these examples, which illustrate the invention, parts and percentages are by weight and temperature, stated in ° C.; in order to determine whether the materials were ready to be quaternized, 1 g. of each reaction product was stirred or shaken in 100 ml. of 2 N acetic acid at 80° C., the obtention of a clear to opalescent, homogeneous liquid indicated that the material was ready to be quaternized.

Example 1

390 parts (1 mol) of hexamethylolmelamine hexamethyl ether together with 419 parts of triethanolamine stearate [consisting of 149 parts (1 mol) of triethanolamine and 270 parts (1 mol) of technical stearic acid] are heated, while stirring and distilling off methanol, for about 4 hours to 150°. Subsequently, as soon as a sample of the reaction product in 2 N warm acetic acid gives a clear solution, 270 parts (1 mol) of stearyl alcohol are added and the condensation is continued while further raising the temperature to 175°. Completion of the reaction at this temperature is effected until methanol no longer distils off and a sample of the reaction product in warm 2 N acetic acid gives opalescent solutions.

192.5 parts (0.2 mol) of the resulting reaction product are mixed during 25 minutes at 70° while stirring with 17.6 parts (0.14 mol) of dimethylsulphate and the resulting mixture stirred for a further hour.

The resulting quaternization product, after cooling, is constituted by a brownish, soft mass which is shaken up in hot water to give an opalescent solution.

The product serves, for example when applied in amounts of from 0.1 to 5 g./l. in the presence of a hardening agent, to achieve on textile material the effects of softeners stable to washing. A quaternization product of similar properties is obtained when, instead of 17.6 parts of dimethyl sulphate, 30.8 parts (0.2 mol) of diethyl sulphate are used and the quaternization is effected at about 100°.

Example 2

Using the same procedure as in Example 1, but using 422 parts of triethanolaminebehenate [consisting of 129 parts (1 mol) triethanolamine and 273 parts (0.8 mol) behenic acid] instead of triethanolamine stearate.

The resulting quaternization product constitutes a brownish mass capable of being distributed in water. It has a very high dispersing power for, for example, wax or paraffin.

Example 3

195 parts (0.5 mol) of hexamethylolmelamine hexamethyl ether together with 270 parts (1 mol) of stearyl alcohol and 104 parts of triethanolamine acetate [consisting of 74.5 parts (0.5 mol) triethanolamine and 30 parts (0.5 mol) acetic acid] are heated while stirring and distilling off methanol during about 5 hours to 170–175°. After about 3 hours at 170–175° methanol no longer distils off, and the condensation is essentially complete. The product is dispersible with opalescence in warm 2 N acetic acid and has an acid number of 2.8.

100 parts (0.1 mol) of the resulting condensation product are dissolved in 16 parts of methanol and quaternized at 67° with 9.35 parts (0.07 mol) of dimethyl sulphate.

The quaternization product consists of a brownish, soft mass which is taken up in hot water to give an opalescent solution. 1 part of the quaternization product is dissolved in 2 parts of paraffin having a melting point of 56–58° to give a clear melt; by stirring this melt into 9 parts of water at about 70° there is formed a highly mobile, very fine concentrated dispersion which is stable to storage. In order to obtain a wash stable hydrophobic effect, for example, on cotton material, e.g. cotton poplin is moved about in a bath with a liquor ratio of 1:10 at 20–25° during 1 minute, said bath containing per 1000 parts 20–160 parts of the above mentioned dispersion and 0.25–2 parts of aluminium sulphate as hardening agent. The material is then squeezed until the increase in weight is 80–100%, dried for 30 minutes at 80° and after treated for a further 10 minutes at 130°.

The materials treated in this way have good or very good hydrophobic effects as regards stability to washing.

Furthermore, such paraffin containing dispersions are also suitable in combination with finishes for imparting crease resistance so that textiles can simultaneously be made hydrophobic and crease resistant.

Example 4

When working is effected under the same conditions as in Example 3, but using 297 parts (1.1 mols), instead of 270 parts, of stearyl alcohol and, instead of triethanolamine acetate, a mixture of 104.5 parts (0.5 mol) of triethanolamine acetate and 97.5 parts (0.5 mol) of triethanolamine formate and the condensation product is reacted with 100.8 parts (0.8 mol) of dimethyl sulphate, there is obtained the quaternization product in the form of a light yellow, brittle mass which is soluble in water to give an almost clear solution and otherwise has similar properties to the product obtained by using a little less stearyl alcohol and only triethanolamine acetate.

Example 5

390 parts (1 mol) of hexamethylolmelamine hexamethyl ether together with 540 parts (2 mols) of stearyl alcohol, 167.2 parts of triethanolamine acetate [consisting of 119.2 parts (0.8 mol) triethanolamine and 48 parts (0.8 mol) acetic acid] and 29.8 parts (0.2 mol) of free triethanolamine are heated, while stirring, to 130°, whereby condensation with distilling off of methanol commences. Thereafter the temperature is slowly raised during about 6 hours to 150° and then the reaction vessel is evacuated to 155 mm. of Hg. The reactants are then heated during about 2 hours to 175–180° and kept at this temperature until no further distillate goes over which is the case after about 1 hour. After cooling, the product consists of a slightly brownish, brittle mass which is dispersible with opalescence in warm 2 N acetic acid.

100.4 parts (0.1 mol) of the resulting condensation product are dissolved in 16 parts of methanol at 66° and 7.6 parts (0.06 mol) of dimethyl sulphate are added during 15 minutes while stirring and stirring is the continued for 1 hour.

The new quaternization product consists of a brownish mass which is taken up in hot water to give an opalescent solution. By mixing this with paraffin in the ratio of 1:2 it is possible to produce in manner similar to that described in Example 3 very fine dispersed, concentrated and storage stable dispersions which may be used for example in combination with fluorocarbon polymerization products, for example Scotchgard FC–208 or Zepel B, to make textiles oil and water repellent.

Example 6

195 parts (0.5 mol) of hexamethylolmelamine hexamethyl ether together with 245 parts of triethanolamine behenate [consisting of 74.5 parts (0.5 mol) of triethanolamine and 170.5 parts (0.5 mol) of behenic acid] are heated, while stirring and evacuating the reaction vessel to 150 mm. of Hg, during 6 hours to 155°, whereby the methyl alcohol arising during the condensation is continuously distilled off. After this period, the product has an acid number of 15 and is soluble in 2 N acetic acid to give a clear solution. 135 parts (0.5 mol) of stearyl alcohol are then added and the temperature is raised during about 2 hours to 175°, while again evacuating to 150 mm. of Hg. After 3 hours the condensation is complete, 95 parts (around 3 mols) of methanol having distilled off and the acid number reached a value of 5.2.

11.3 parts (0.09 mol) of dimethyl sulphate are added, while stirring, at 70–75° during 20 minutes to 103.5 parts (0.1 mol) of the resulting condensation product. The quaternization product is obtained as a light brownish mass which can be dispersed in warm water; this mass forms a clear solution when melted together at 60–65° with paraffin having a melting point of 50–52°. The product, especially in combination with paraffin, can be dissolved in warm water to give very fine opalescent dispersions which in concentrated form, for example with a dry substance content of 25%, show very good stability to storing. They can be used as agents for making textiles hydrophobic or may be used in combination with rot proofing agents to make textiles simultaneously hydrophobic and rot resistance.

Example 7

390 parts (1 mol) of hexamethylolmelamine hexamethyl ether together with 540 parts (2 mols) of stearyl alcohol and 221 parts of triethanolamine acetate [consisting of 149 parts (1 mol) triethanolamine and 72 parts (1.2 mols) acetic acid] are heated, while stirring and distilling off methanol, to 173° during about 6 hours and kept at this temperature for a further 2 hours. After cooling, the condensation product is obtained in the form of a yellowish-brown, brittle mass which is insoluble in water and has an acid number of 3.4.

100 parts (0.1 mol) of the resulting condensation product are dissolved in 16 parts of methanol and 10.08 parts (0.08 mol) of dimethyl sulphate are added at 64–66° during about 2 hours.

This quaternization product consists of a slightly brittle, yellowish-brown mass which forms opalescent solutions with warm water.

Example 8

A quaternization product is produced in the same way as described in Example 3, but instead of using triethanolamine acetate, 179 parts (1 mol) of methyldiethanolamine acetate are used and 113.4 parts (0.9 mol) of dimethyl sulphate as the quaternization agent. A brownish, brittle mass is obtained which can be distributed in hot water.

Example 9

390 parts (1 mol) of hexamethylolmelamine hexamethyl ether together with 270 parts of stearyl alcohol and a mixture of 167.2 parts of triethanolamine acetate [consisting of 119.2 parts (0.8 mol) of triethanolamine and 48 parts (0.8 mol) of acetic acid] and 83.8 parts of triethanolamine stearate [consisting of 29.8 parts (0.2 mol) of triethanolamine and 54 parts (0.2 mol) of stearic acid] are heated to 162° during 5 hours while stirring and distilling off methanol. After this time, 85 parts of distillate have gone over and the product is soluble in 2 N acetic acid to give a clear solution. It has an acid number of 10.2. At 73–75° 20.14 parts (0.16 mol) of dimethyl sulphate are added dropwise, while stirring over a period of 15 minutes, to 161 parts (0.2 mol) of the resulting condensation product and stirring is continued for about 2 hours.

The new quaternization product is constituted by a yellowish-brown, soft mass which is soluble in warm water to give an almost clear solution.

Example 10

195 parts (0.5 mol) of hexamethylolmelamine hexamethyl ether together with 136.5 parts (0.4 mol) of behenic acid and 135 parts (0.5 mol) of stearyl alcohol are heated to 180° during 6 hours while gradually evacuating to 30 mm. of Hg and subsequently kept for a further 2 hours at this temperature. After this time practically no further methanol distils off and the product has reached an acid number of 3.5.

After cooling to about 130°, a mixture of 74.5 parts (0.5 mol) of triethanolamine and 24 parts (0.4 mol) of acetic acid is added. The temperature of the reaction mixture is increased to 152° during 3 hours, methyl alcohol distilling off being collected in a vessel. After this time, the reaction product is soluble in warm 2 N acetic acid to give an almost clear solution and has an acid number of 21.6.

97.5 parts (0.1 mol) of the resulting condensation product are dissolved in 16 parts of methanol and quaternized at 64–67° with 8.82 parts (0.07 mol) of dimethyl sulphate.

The quaternization product is constituted by a brownish mass which is dispersible in water with opalescence to slight clouding.

In the above examples the terms "triethanolamine-formate, -acetate, -stearate and -behenate" indicate the salts of triethanolamine with formic, acetic, stearic and behenic acid, respectively.

When in the above examples hexamethylolmelamine hexamethyl ether is replaced with an equivalent amount of hexamethylolmelamine-hexaethyl, -propyl, or -butyl ether, products are obtained having similar properties to those of the corresponding ones from the hexamethyl ether.

When in the above Examples 3 to 5 and 7 to 10 the tirethanolamine acetate is replaced with the equivalent amount of triethanolamine propionate, products with similar properties are obtained.

Although the present invention is described herein with particular reference to specific details, it is not intended that such details shall be regarded as limitations upon the scope of the invention except insofar as included in the accompanying claims.

We claim:

1. A water soluble or water dispersible, hardenable quaternized melamine derivative containing monocarboxylic acid radicals with 1 to 30 carbon atoms, alkoxy radicals with 12 to 30 carbon atoms and quaternary nitrogen atoms, resulting by the reaction of 1 mol of hexamethylolmelamine at least 80% by weight of which is etherified with a low molecular weight alcohol with (a) one or more organic monocarboxylic acids with 1 to 30 carbon atoms,
(b) 0.5 to 1.2 mols of a tertiary amine containing at least one hydroxy alkyl radical with 2 to 4 carbon atoms, and
(c) 0.5 to 2.5 mols of a fatty alcohol with 12 to 30 carbon atoms or a mixture of such fatty alcohols, with the proviso that at least 80% of (b) must be present in the form of a salt with (a) and that the total quantity of (a) used amounts to 0.4 to 2.5 mols, the portion of any monocarboxylic acid or acids with 12 to 30 carbon atoms present being chosen in such a way that the sum of the latter and (c) amounts to at least 1 mol and at most 2.5 mols, and quaternizing thereafter.

2. A quaternized melamine derivative as claimed in claim 1, being a quaternized reaction product of
   (i) hexamethylolmelamine-hexamethyl, -ethyl, -propyl or -butyl ether,
   (ii) triethanolamine stearate, and
   (iii) stearyl alcohol.

3. A quaternized melamine derivative as claimed in claim 1, being a quaternized reaction product of
   (i) hexamethylolmelamine-hexamethyl, -ethyl, -propyl or -butyl ether,
   (ii) triethanolamine behenate, and
   (iii) stearyl alcohol.

4. A quaternized melamine derivative as claimed in claim 1, being a quaternized reaction product of
   (i) hexamethylolmelamine-hexamethyl, -ethyl, -propyl or -butyl ether,
   (ii) triethanolamine acetate, and
   (iii) stearyl alcohol.

5. A quaternized melamine derivative as claimed in claim 1, being a quaternized reaction product of
   (i) hexamethylolmelamine-hexamethyl, -ethyl, -propyl or -butyl ether,
   (ii) a mixture of triethanolamine acetate and triethanolamine formate, and
   (iii) stearyl alcohol.

6. A quaternized melamine derivative as claimed in claim 1, being a quaternized reaction product of
   (i) hexamethylolmelamine-hexamethyl, -ethyl, -propyl or -butyl ether,
   (ii) triethanolamine acetate and free triethanolamine, and
   (iii) stearyl alcohol.

7. A quaternized melamine derivative as claimed in claim 1, being a quaternized reaction product of
   (i) hexamethylolmelamine-hexamethyl, -ethyl, -propyl or -butyl ether,
   (ii) methyldiethanolamine acetate, and
   (iii) stearyl alcohol.

8. A quaternized melamine derivative as claimed in claim 1, being a quaternized reaction product of
   (i) hexamethylolmelamine-hexamethyl, -ethyl, -propyl or -butyl ether,
   (ii) triethanolamine stearate and acetate, and
   (iii) stearyl alcohol.

9. A quaternized melamine derivative as claimed in claim 1, being a quaternized reaction product of
   (i) hexamethylolmelamine-hexamethyl, -ethyl, -propyl or -butyl ether,
   (ii) behenic acid and stearic acid,
   (iii) triethanolamine, and
   (iv) stearyl alcohol.

10. A quaternized melamine derivative as claimed in claim 1, in which constituent (a) comprises at least 0.4 mol, for every mol of the hexamethylolmelamine ether, of a fatty acid with 2 or 3 carbon atoms in the molecule.

11. A quaternized melamine derivative as claimed in claim 1, in which the constituent (b) contains 3 hydroxyalkyl radicals each with 2–4 carbon atoms.

12. A quaternized melamine derivative as claimed in claim 1, in which constituent (b) is triethanolamine.

13. A quaternized melamine derivative as claimed in claim 1, in which constituent (c) is stearyl alcohol.

14. A quaternized melamine derivative as claimed in claim 1, in which constituent (a) is a mixture of monocarboxylic acids of which at least one contains up to 11 carbons atoms in the molecule and another one 12 to 30 carbon atoms.

15. A quaternized melamine derivative as claimed in claim 1, in which 0.8 to 1.5 mols of constituent (a) is used per mol of constituent (b).

16. A quaternized melamine derivative as claimed in claim 1, in which 1.0 to 2.2 mols of constituent (c) is used per mol of hexamethylolmelamine.

17. A quaternized melamine derivative as claimed in claim 1, in which the quaternization agent is dimethyl sulphate or diethyl sulphate.

References Cited
UNITED STATES PATENTS

| | | | |
|---|---|---|---|
| 2,433,802 | 12/1947 | West | 260—249.6 XR |
| 3,219,666 | 11/1965 | Norman et al. | 260—249.6 XR |
| 3,352,838 | 11/1967 | Toepfl et al. | 260—249.6 XR |

HENRY R. JILES, Primary Examiner

JOHN M. FORD, Assistant Examiner

U.S. Cl. X.R.

117—139.5, 142, 155; 252—8.8, 8.57, 311, 311.5; 260—29.4